United States Patent
Vaccaro et al.

(10) Patent No.: US 12,031,651 B2
(45) Date of Patent: Jul. 9, 2024

(54) ADAPTER FOR MOUNTING CABLES AND CABLE HANGERS

(71) Applicant: CommScope Technologies LLC, Hickory, NC (US)

(72) Inventors: Ronald A. Vaccaro, Taylorsville, NC (US); Aviral Joshi, Oak Park, IL (US); Taig S. Rajpal, Chicago, IL (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 0 days.

(21) Appl. No.: 18/351,032

(22) Filed: Jul. 12, 2023

(65) Prior Publication Data
US 2023/0358341 A1 Nov. 9, 2023

Related U.S. Application Data

(60) Continuation of application No. 17/864,868, filed on Jul. 14, 2022, now Pat. No. 11,703,149, which is a (Continued)

(51) Int. Cl.
 *F16L 3/13* (2006.01)
 *F16L 3/22* (2006.01)
 *H02G 3/04* (2006.01)

(52) U.S. Cl.
 CPC ............... *F16L 3/13* (2013.01); *F16L 3/221* (2013.01); *H02G 3/0456* (2013.01); *F16L 3/222* (2013.01)

(58) Field of Classification Search
 CPC .......... F16M 3/13; F16M 3/221; F16M 3/222; H02G 3/0456
 See application file for complete search history.

(56) References Cited

U.S. PATENT DOCUMENTS

| | | |
|---|---|---|
| 582,086 A | 5/1897 | Poole et al. |
| 924,090 A | 6/1909 | Moore |

(Continued)

FOREIGN PATENT DOCUMENTS

| | | |
|---|---|---|
| BR | 102014007903 A2 | 12/2015 |
| CN | 1520498 A | 8/2004 |

(Continued)

OTHER PUBLICATIONS

"English Translation of Second Office Action corresponding to Chinese Patent Application No. 201780067453.8 dated Jul. 20, 2020, 18 pages".

(Continued)

*Primary Examiner* — Eret C McNichols
(74) *Attorney, Agent, or Firm* — Myers Bigel, P.A.

(57) ABSTRACT

An adapter for mounting cable hangers to a mounting structure includes: a plurality of mounting panels, each mounting panel including a mounting hole, the mounting panels attached to each other at edges thereof, each mounting panel being disposed at an angle relative to its adjacent mounting panels; a base attached to the edge of endmost ones of the mounting panels; wherein the mounting panels and the base define an interior of the adapter; the adapter further comprising at least one pair of fingers extending into the interior of the adapter, each pair of fingers being configured to cooperate to grasp a cable.

13 Claims, 9 Drawing Sheets

Related U.S. Application Data continuation of application No. 16/876,403, filed on May 18, 2020, now Pat. No. 11,396,958, which is a division of application No. 15/804,178, filed on Nov. 6, 2017, now Pat. No. 10,663,088.

(60) Provisional application No. 62/420,608, filed on Nov. 11, 2016.

(56) References Cited

U.S. PATENT DOCUMENTS

| | | | |
|---|---|---|---|
| 1,376,284 A | 4/1921 | Kohn | |
| 1,452,497 A | 4/1923 | Fischer | |
| 1,982,501 A | 11/1934 | Douglas | |
| 2,032,413 A | 3/1936 | Hall | |
| 2,166,916 A | 7/1939 | Lombard | |
| 2,179,406 A | 11/1939 | Ray | |
| 2,375,513 A | 8/1945 | Bach | |
| 2,447,025 A | 8/1948 | Newman | |
| 2,453,980 A | 11/1948 | Hartmann | |
| 2,470,814 A | 5/1949 | Hain | |
| 2,495,848 A | 1/1950 | Kiesel | |
| 2,560,845 A | 7/1951 | Carpenter et al. | |
| 2,605,865 A | 8/1952 | Liptay | |
| 2,723,431 A | 11/1955 | Simon | |
| 2,746,110 A | 5/1956 | Bedford | |
| 2,990,150 A | 6/1961 | Weigel et al. | |
| 3,042,352 A | 7/1962 | Stamper | |
| 3,050,578 A | 8/1962 | Huebner | |
| 3,163,712 A | 12/1964 | Cochran | |
| 3,179,969 A | 4/1965 | Glynn | |
| 3,189,961 A | 6/1965 | Heller | |
| 3,228,640 A | 1/1966 | Wolsh | |
| 3,404,858 A | 10/1968 | Erwin | |
| 3,430,904 A | 3/1969 | Soltysik | |
| 3,485,467 A | 12/1969 | Fuchs et al. | |
| 3,501,117 A | 3/1970 | Soltysik | |
| 3,536,281 A | 10/1970 | Meehan et al. | |
| 3,599,915 A | 8/1971 | Soltysik | |
| 3,916,089 A | 10/1975 | Alfred | |
| 3,981,048 A | 9/1976 | Moody et al. | |
| 4,148,113 A | 4/1979 | Dvorachek | |
| 4,244,542 A | 1/1981 | Mathews | |
| 4,244,544 A | 1/1981 | Kornat | |
| 4,295,618 A | 10/1981 | Morota et al. | |
| 4,306,697 A | 12/1981 | Mathews | |
| 4,344,480 A | 8/1982 | Boyer et al. | |
| 4,356,987 A | 11/1982 | Schmid | |
| 4,441,680 A | 4/1984 | Rivkin et al. | |
| 4,669,156 A | 6/1987 | Guido et al. | |
| 4,795,856 A | 1/1989 | Farmer | |
| 4,813,639 A | 3/1989 | Midkiff et al. | |
| D305,099 S | 12/1989 | Ono et al. | |
| 4,958,792 A | 9/1990 | Rinderer | |
| 5,016,843 A | 5/1991 | Ward | |
| 5,035,383 A | 7/1991 | Rainville | |
| 5,085,384 A | 2/1992 | Kasubke | |
| 5,149,027 A | 9/1992 | Weber | |
| 5,188,318 A | 2/1993 | Newcomer et al. | |
| 5,320,312 A | 6/1994 | Hoenninger | |
| 5,393,021 A | 2/1995 | Nelson | |
| D357,802 S | 5/1995 | Todd et al. | |
| 5,587,555 A | 12/1996 | Rinderer | |
| 5,677,513 A | 10/1997 | Ito et al. | |
| 5,762,299 A | 6/1998 | Motsch | |
| 5,833,188 A | 11/1998 | Studdiford et al. | |
| 5,876,000 A | 3/1999 | Ismert | |
| 5,878,465 A | 3/1999 | Jenner | |
| 5,921,520 A | 7/1999 | Wisniewski | |
| 5,971,329 A | 10/1999 | Hickey | |
| 6,257,530 B1 | 7/2001 | Tsai | |
| 6,317,933 B1 | 11/2001 | Suenaga | |
| 6,323,430 B1 | 11/2001 | Finona | |
| 6,354,543 B1 | 3/2002 | Paske | |
| 6,580,867 B2 | 6/2003 | Galaj et al. | |
| 6,899,305 B2 | 5/2005 | Korczak et al. | |
| 6,935,001 B2 | 8/2005 | Barriuso et al. | |
| 7,131,792 B2 | 11/2006 | Doverspike | |
| 7,384,018 B2 | 6/2008 | Moretto | |
| 7,500,644 B2 | 3/2009 | Naudet et al. | |
| 7,518,058 B1 | 4/2009 | Hagbrandt et al. | |
| 7,533,854 B2 | 5/2009 | Aube | |
| D597,403 S | 8/2009 | Ho et al. | |
| 7,651,056 B2 | 1/2010 | Tjerrild | |
| 7,997,546 B1 | 8/2011 | Andersen et al. | |
| 8,011,621 B2 | 9/2011 | Korczak | |
| 8,020,259 B2 | 9/2011 | Ho et al. | |
| 8,020,811 B2 | 9/2011 | Nelson | |
| 8,191,836 B2 | 6/2012 | Korczak | |
| 8,353,485 B2 | 1/2013 | Hjerpe | |
| 8,439,316 B2 | 5/2013 | Feige | |
| 8,540,191 B2 | 9/2013 | Sabadie et al. | |
| 8,541,682 B2 | 9/2013 | Mazelle et al. | |
| 8,776,328 B2 | 7/2014 | Kodi | |
| 8,785,779 B1 | 7/2014 | Jones et al. | |
| 8,879,881 B2 | 11/2014 | Cote et al. | |
| 9,127,789 B2 | 9/2015 | Caspari et al. | |
| 9,206,927 B2 | 12/2015 | Carter et al. | |
| 9,759,880 B2 | 9/2017 | Chamberlain et al. | |
| 9,841,123 B1 | 12/2017 | White | |
| 9,853,434 B2 | 12/2017 | Vaccaro | |
| 9,866,004 B2 | 1/2018 | Vaccaro et al. | |
| 9,879,803 B2 | 1/2018 | Leng | |
| 9,903,510 B2 | 2/2018 | Joshi et al. | |
| 9,995,414 B2 | 6/2018 | Joshi et al. | |
| 10,215,308 B2 | 2/2019 | Bartos | |
| 10,415,723 B2 | 9/2019 | Vaccaro et al. | |
| 10,422,446 B2 | 9/2019 | Joshi et al. | |
| 10,634,265 B2 | 4/2020 | Joshi et al. | |
| 10,637,226 B2 | 4/2020 | Bell et al. | |
| 10,663,088 B2 | 5/2020 | Vaccaro et al. | |
| 10,760,714 B2 | 9/2020 | Rajpal et al. | |
| 10,823,312 B2 | 11/2020 | Vaccaro et al. | |
| 10,837,577 B2 | 11/2020 | Arbuckle | |
| 10,927,980 B2 | 2/2021 | Varale | |
| 10,935,105 B2 | 3/2021 | Bell et al. | |
| 2002/0005463 A1 | 1/2002 | Paske et al. | |
| 2002/0012582 A1 | 1/2002 | Kirkegaard et al. | |
| 2003/0173470 A1 | 9/2003 | Geiger | |
| 2004/0113027 A1 | 6/2004 | Nakanishi | |
| 2004/0251386 A1 | 12/2004 | Mizukoshi et al. | |
| 2005/0109887 A1 | 5/2005 | Catapano | |
| 2005/0109890 A1 | 5/2005 | Korczak et al. | |
| 2005/0253025 A1 | 11/2005 | Benoit et al. | |
| 2006/0108480 A1 | 5/2006 | Goodwin et al. | |
| 2006/0237217 A1 | 10/2006 | Glew | |
| 2006/0249633 A1 | 11/2006 | Korczak et al. | |
| 2007/0007397 A1 | 1/2007 | Nelson | |
| 2007/0120023 A1 | 5/2007 | Martinez et al. | |
| 2007/0246616 A1 | 10/2007 | Budagher | |
| 2008/0115448 A1 | 5/2008 | Kodi | |
| 2008/0093510 A1 | 8/2008 | Oh et al. | |
| 2009/0230256 A1 | 9/2009 | Widlacki et al. | |
| 2009/0242715 A1 | 10/2009 | Kosidlo et al. | |
| 2009/0294602 A1 | 12/2009 | Korczak | |
| 2010/0084520 A1 | 4/2010 | Ohno | |
| 2011/0107719 A1 | 5/2011 | Kodi | |
| 2011/0226913 A1 | 9/2011 | Feige | |
| 2011/0260025 A1 | 10/2011 | Aoshima et al. | |
| 2011/0283515 A1 | 11/2011 | Korczak | |
| 2012/0045608 A1 | 2/2012 | Huchet et al. | |
| 2012/0085577 A1 | 4/2012 | Eshima et al. | |
| 2012/0305724 A1 | 12/2012 | Diez et al. | |
| 2013/0104494 A1 | 5/2013 | Evangelista et al. | |
| 2013/0146720 A1 | 6/2013 | Meyers et al. | |
| 2013/0146721 A1 | 6/2013 | White | |
| 2013/0175407 A1 | 7/2013 | Williams et al. | |
| 2013/0187012 A1 | 7/2013 | Blakeley et al. | |
| 2013/0320157 A1 | 12/2013 | Carter et al. | |
| 2013/0320182 A1 | 12/2013 | Kataoka et al. | |
| 2014/0054425 A1 | 2/2014 | Cheol | |
| 2014/0259620 A1 | 9/2014 | Hicks et al. | |
| 2014/0260083 A1 | 9/2014 | Zhang et al. | |
| 2014/0306071 A1 | 10/2014 | Stechmann | |

(56) References Cited

U.S. PATENT DOCUMENTS

| | | | |
|---|---|---|---|
| 2015/0136473 | A1 | 5/2015 | Jafari et al. |
| 2015/0155669 | A1 | 6/2015 | Chamberlain et al. |
| 2015/0159781 | A1 | 6/2015 | Wilson et al. |
| 2016/0281881 | A1 | 9/2016 | Vaccaro et al. |
| 2016/0281883 | A1 | 9/2016 | Vaccaro |
| 2016/0327187 | A1 | 11/2016 | Brown |
| 2016/0341340 | A1 | 11/2016 | Fernandes |
| 2017/0122460 | A1* | 5/2017 | Joshi ............... H02G 3/32 |
| 2018/0045336 | A1 | 2/2018 | Vaccaro |
| 2018/0172183 | A1* | 6/2018 | Joshi ............... F16L 3/221 |
| 2018/0202580 | A1* | 7/2018 | Joshi ............... H02G 3/32 |
| 2020/0041039 | A1* | 2/2020 | Varale ............... F16L 3/222 |
| 2021/0108742 | A1 | 4/2021 | Varale |
| 2021/0151971 | A1* | 5/2021 | Vaccaro ............... F16L 3/12 |

FOREIGN PATENT DOCUMENTS

| | | |
|---|---|---|
| CN | 101589513 A | 11/2009 |
| DE | 845808.1 C | 8/1952 |
| DE | 2401187 A1 | 1/1975 |
| DE | 2903306 A1 | 8/1979 |
| DE | 2921891 A1 | 12/1980 |
| DE | 3823578 A1 | 2/1989 |
| DE | 202015007620.3 U1 | 12/2015 |
| DE | 102017106520 A1 | 9/2018 |
| EP | 3539191 A2 | 9/2019 |
| FR | 2145985 A6 | 2/1973 |
| FR | 2176184 A5 | 10/1973 |
| GB | 1599416 A | 9/1981 |
| GB | 2203433 A | 10/1988 |
| JP | 61200974 | 12/1986 |
| JP | 886386 | 4/1996 |
| JP | 9144719 | 6/1997 |
| JP | 10019168 | 1/1998 |
| JP | 11223281 | 8/1999 |
| JP | 2002130539 A | 5/2002 |
| JP | 3653346 B2 | 3/2005 |
| JP | 2012002323 A | 1/2012 |
| JP | 2012222986 A | 11/2012 |
| JP | 5775283 B2 | 7/2015 |
| KR | 101399938 B1 | 6/2014 |
| WO | F2002095956 | 11/2002 |
| WO | 2008082595 A1 | 7/2008 |
| WO | 2010143222 A1 | 12/2010 |

OTHER PUBLICATIONS

"Examination Report corresponding to European Application No. 17870023.3 dated May 31, 2021".
"Examination Report corresponding to European Application No. 17870144.7 dated Apr. 22, 2021".
"Examination Report corresponding to European Application No. 17875334.9 dated Oct. 14, 2021".
"Extended European Search Report corresponding to European Application No. 17870023.3 dated Jun. 3, 2020".
"Extended European Search Report corresponding to European Application No. 17870144.7 dated Jun. 3, 2020".
"Extended European Search Report corresponding to European Application No. 17875334.9 dated Jun. 2, 2020".
"Extended European Search Report corresponding to European Patent Application No. 17892843.8 mailed Oct. 1, 2020, 8 pages".
"International Preliminary Report on Patentability corresponding to International Application No. PCT/US2017/056019 mailed May 23, 2019".
"International Preliminary Report on Patentability corresponding to International Application No. PCT/US2017/060115 mailed May 23, 2019".
"International Preliminary Report on Patentability corresponding to International Application No. PCT/US2017/062730 mailed Jun. 13, 2019".
"International Preliminary Report on Patentability corresponding to International Application No. PCT/US2017/062743 mailed Jun. 27, 2019".
"International Preliminary Report on Patentability corresponding to International Application No. PCT/US2017/068510 mailed Aug. 1, 2019".
"International Preliminary Report on Patentability corresponding to International Application No. PCT/US2019/042952 mailed Feb. 11, 2021".
"International Search Report and Written Opinion corresponding to International Application No. PCT/US2019/042952 mailed Nov. 8, 2019".
"Notification Concerning Transmittal of International Preliminary Report on Patentability corresponding to International Application No. PCT/US2017/062743 mailed Jun. 27, 2019".
"Notification Concerning Transmittal of International Preliminary Report on Patentability, corresponding to International Application No. PCT/US2017/068510 mailed Aug. 1, 2019".
"Notification of Transmittal of the International Search Report and the Written Opinion of the International Searching Authority, or the Declaration corresponding to International Application No. PCT/US2017/056019 mailed Jan. 24, 2018".
"Notification of Transmittal of the International Search Report and the Written Opinion of the International Searching Authority, or the Declaration corresponding to International Application No. PCT/US2017/056109 mailed Jan. 24, 2018".
"Notification of Transmittal of the International Search Report and the Written Opinion of the International Searching Authority, or the Declaration corresponding to International Application No. PCT/US2017/060115 mailed Feb. 14, 2018".
"Notification of Transmittal of the International Search Report and the Written Opinion of the International Searching Authority, or the Declaration corresponding to International Application No. PCT/US2017/062730 mailed Mar. 13, 2018".
"Notification of Transmittal of the International Search Report and the Written Opinion of the International Searching Authority, or the Declaration corresponding to International Application No. PCT/US2017/062743 mailed Mar. 12, 2018".
"Notification of Transmittal of the International Search Report and the Written Opinion of the International Searching Authority, or the Declaration corresponding to International Application No. PCT/US2017/065801 mailed Apr. 13, 2018".
"Notification of Transmittal of the International Search Report and the Written Opinion of the International Searching Authority, or the Declaration corresponding to International Application No. PCT/US2017/068510 mailed Apr. 17, 2018".
"Notification of Transmittal of the International Search Report and the Written Opinion of the International Searching Authority, or the Declaration corresponding to International Application No. PCT/US2019/042952 mailed Nov. 8, 2019".
"Office Action corresponding to Chinese Application No. 201780065736.9 issued Mar. 2, 2020".
"Office Action corresponding to Chinese Application No. 201780067453.8 issued Jan. 22, 2020".
"Office Action corresponding to Chinese Application No. 201780067453.8 issued Oct. 22, 2020".
"Office Action corresponding to Chinese Application No. 201780067503.2 issued Feb. 3, 2020".
"Office Action corresponding to Chinese Application No. 201780075195.8 dated Mar. 29, 2021".
"Office Action corresponding to Chinese Application No. 201780075195.8 issued Jan. 21, 2020".
"Office Action corresponding to Chinese Application No. 201780075195.8 issued Nov. 3, 2020".
"Office Action corresponding to Chinese Application No. 201780075198.5 issued Jan. 21, 2020".
"PCT Notification of Transmittal of the International Search Report and the Written Opinion of the International Searching Authority, or the Declaration, corresponding to PCT International Application No. PCT/US2019/042952, mailed Nov. 8, 2019, 11 pages".

* cited by examiner

{PRIOR ART}

ADAPTER FOR MOUNTING CABLES AND CABLE HANGERS

RELATED APPLICATIONS

This application is a continuation of and claims priority to U.S. patent application Ser. No. 17/864,868, filed Jul. 18, 2023, now U.S. Pat. No. 11,703,149, which is a continuation of and claims priority to U.S. patent application Ser. No. 16/876,403, filed May 18, 2020, now U.S. Pat. No. 11,396,958, which is a divisional of and claims priority to U.S. patent application Ser. No. 15/804,178, filed Nov. 6, 2017, now U.S. Pat. No. 10,663,088, which claims priority from and the benefit of U.S. Provisional Patent Application No. 62/420,608, filed Nov. 11, 2016, the disclosures of which are hereby incorporated herein in their entirety.

FIELD OF THE INVENTION

This invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. The locking projections of a hanger are inserted into a hole in the antenna tower (typically in the leg of the antenna tower) to secure the hanger to the tower. Hangers can be "stacked" onto each other by inserting the locking projections of one hanger into the large aperture of the next hanger. One variety of cable hanger of this type is the SNAP-STAK® hanger, available from CommScope, Inc. (Joliet, Illinois). Other cable hangers are shown in U.S. patent application Ser. No. 15/081,177, filed Mar. 25, 2016, Ser. No. 15/081,240, filed Mar. 25, 2016, and Ser. No. 15/335,614, filed Oct. 27, 2016, the disclosures of each of which are hereby incorporated herein by reference in full.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three mounting panels 14. Each of the mounting panels 14 includes a mounting hole 16 that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

It may be desirable to provide additional configurations for mounting cable hangers.

SUMMARY OF THE INVENTION

As a first aspect, embodiments of the invention are directed to an adapter for mounting cable hangers to a mounting structure, comprising: a plurality of mounting panels, each mounting panel including a mounting hole, the mounting panels attached to each other at edges thereof, each mounting panel being disposed at an angle relative to its adjacent mounting panels; and a base attached to the edge of endmost ones of the mounting panels, wherein the mounting panels and the base define an interior of the adapter. The adapter further comprises at least one pair of fingers extending into the interior of the adapter, each pair of fingers being configured to cooperate to grasp a cable.

As a second aspect, embodiments of the invention are an adapter for mounting cable hangers to a mounting structure, comprising: a mounting panel; side walls attached to edges of the mounting panel; and a base attached to the edges of the side walls, wherein the mounting panel, the side walls and the base define an interior of the adapter. The adapter further comprises at least two pairs of fingers extending into the interior of the adapter, each pair of fingers being configured to cooperate to grasp a cable.

DETAILED DESCRIPTION OF THE EMBODIMENTS

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
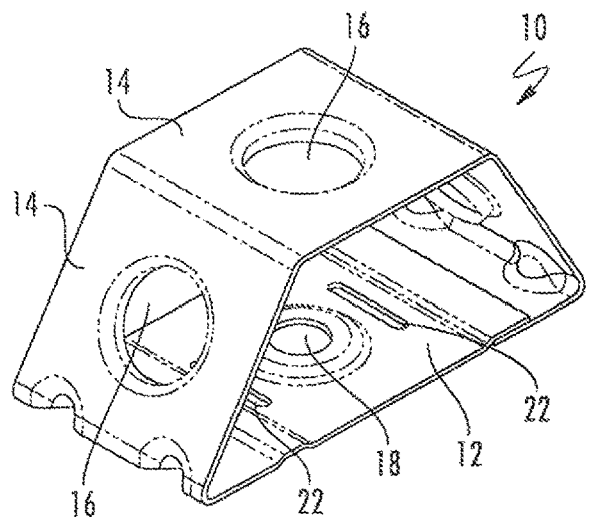
FIG. 1 is a perspective view of a prior art adapter for cable hangers.
Figure 2:
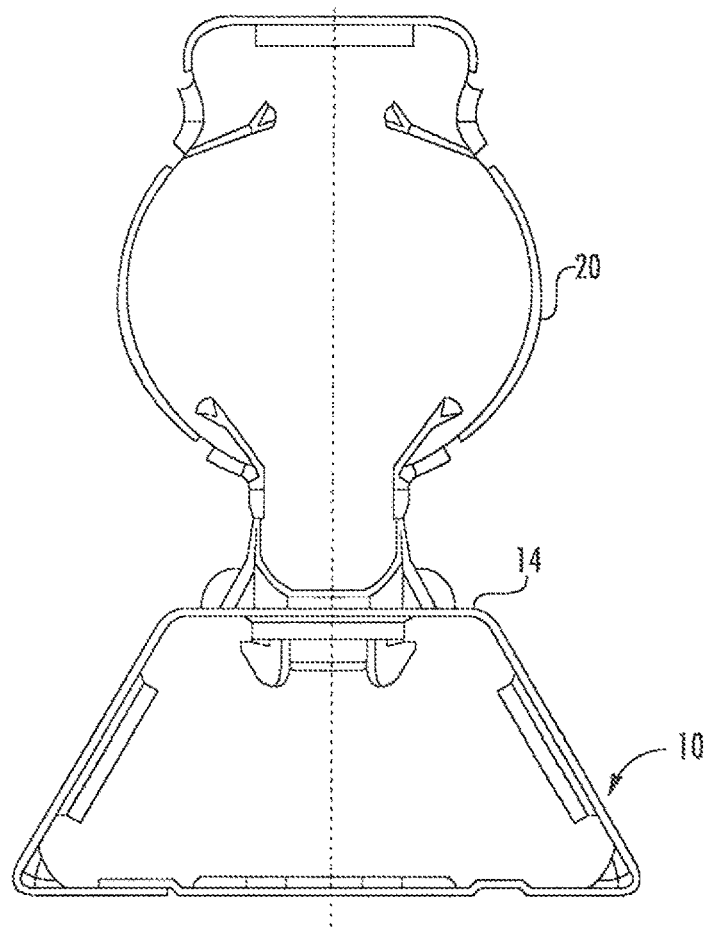
FIG. 2 is a top view of an adapter of FIG. 1 with a cable hanger mounted therein.
Figure 3:
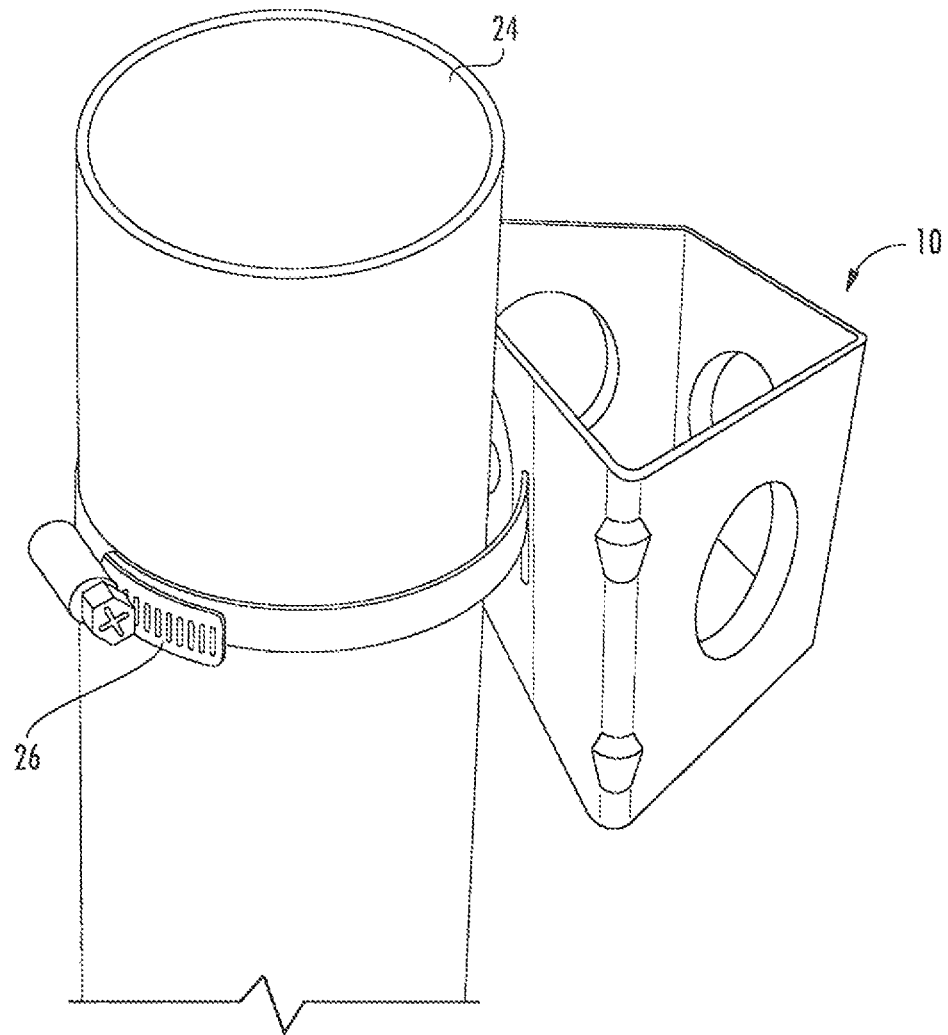
FIG. 3 is a perspective view of the adapter of FIG. 1 mounted to a pole via a hose clamp.
Figure 4:
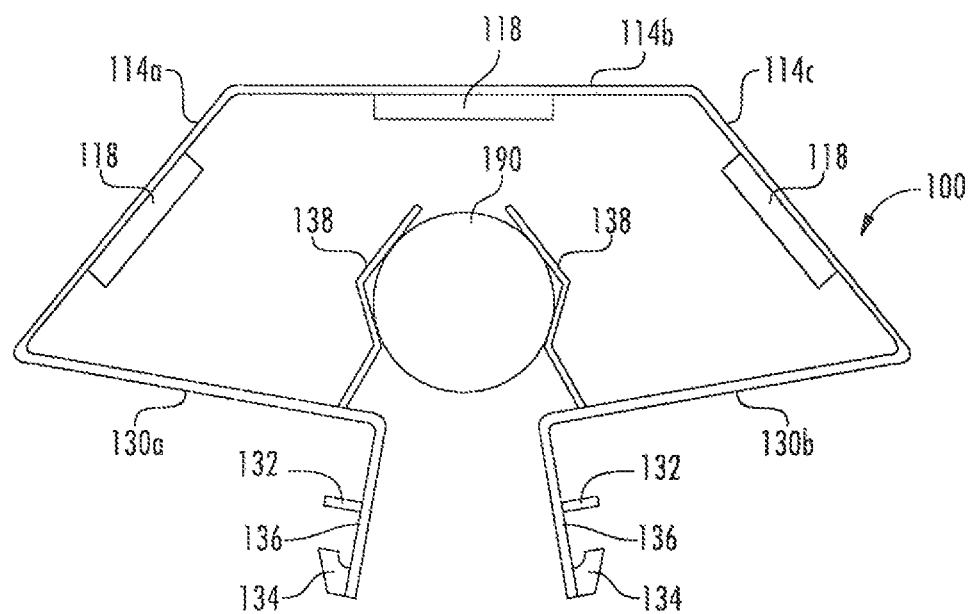
FIG. 4 is a top view of a cable adapter according to embodiments of the invention, shown in a relaxed condition.
Figure 5:
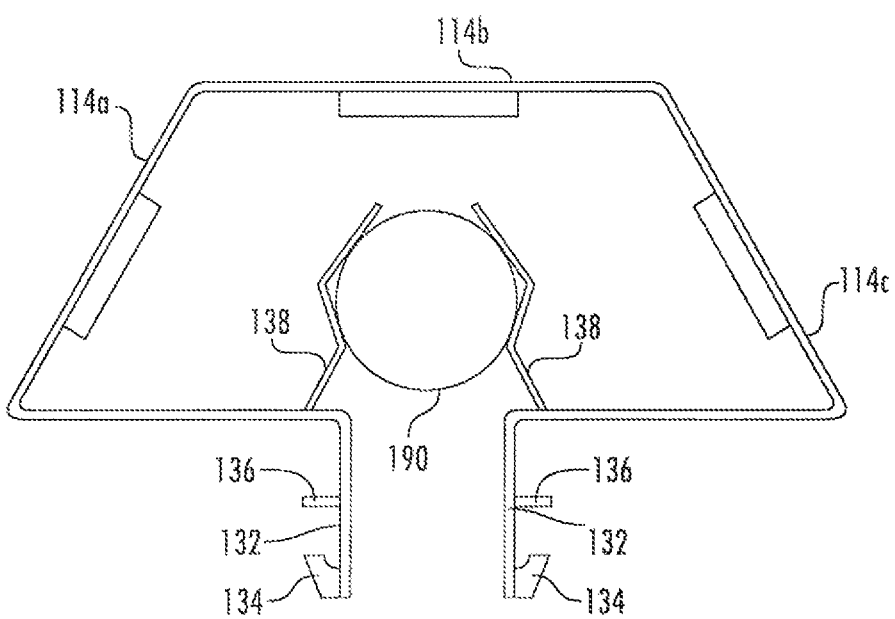
FIG. 5 is a top view of the cable adapter of FIG. 4, shown in a deflected condition.

Referring now to the drawings, a snap-in adapter for a cable hanger, designated broadly at 100, is shown in FIGS. 4 and 5. The adapter 100 has three mounting panels 114a, 114b, 114c, each with a hole 118, similar to the mounting panels 14 discussed above. However, the adapter 100 lacks a base panel that spans the rear edges of the mounting panels 114a, 114c. Instead, the adapter 100 has two base segments 130a, 130b that extend inwardly from the rear edges of the mounting panels 114a, 114c. A locking arm 132 extends rearwardly from inward edge of each of the base segments 130a, 130b. Locking projections 134 extend from the rear ends of the locking arms 132.

In addition, the adapter 100 includes a cantilevered finger 138 that extends from each locking segment 130a, 130b into the interior of the adapter 100. Each finger 138 is shown as being tripartite (i.e., having three segments), but other configurations and arrangements are possible. As can be seen in FIG. 4, the fingers 138 are positioned and configured to grasp a cable 190 positioned between the fingers 138.

Figure 7:
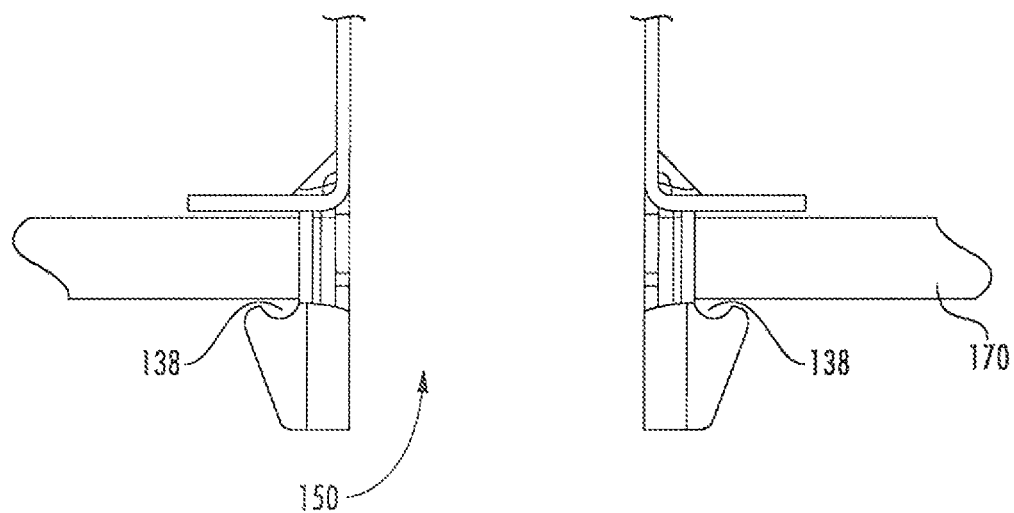
FIG. 7 is an enlarged top view of the locking projections of FIG. 6 inserted into a hold of a mounting structure.

As can be seen in FIG. 4, in its relaxed state, the locking arms 132 of the adapter 100 splay slightly outwardly from each other. As shown in FIG. 5, the adapter 100 can be flexed (usually by pinching the locking arms 132 toward each other) to reduce the space between the locking projections 134. Once the gap between the locking projections 134 has been sufficiently reduced, the locking projections 134 can be inserted into a mounting hole 150 (typically a ¾ inch hole) in a mounting structure 170 (as shown in FIG. 7) to mount the adapter 100 in place. Once the adapter 100 is mounted, cable hangers such as those discussed above can be mounted in the holes 118 in the mounting panels 114a, 114b, 114c.

Figure 6:
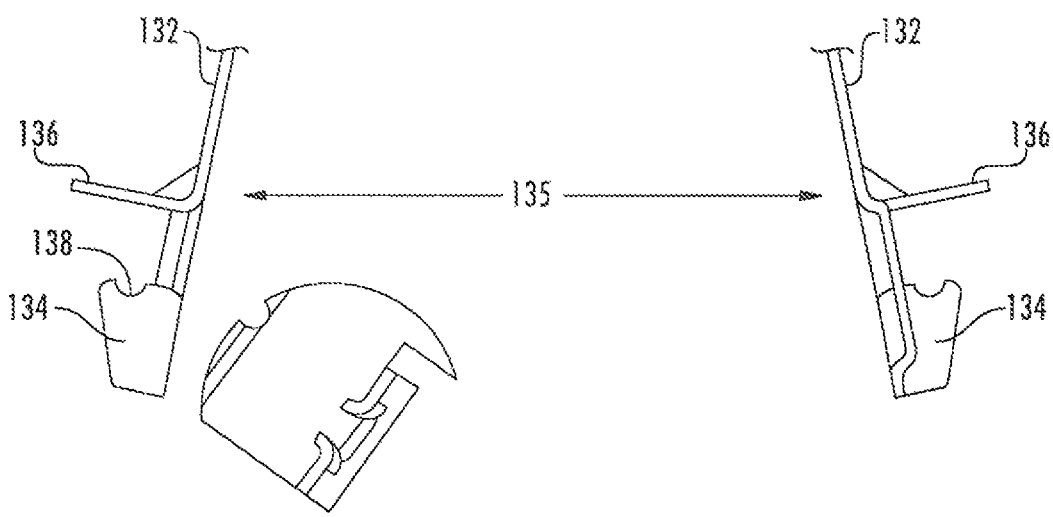
FIG. 6 is an enlarged top view of the locking projections of the adapter of FIG. 4.

Referring now to FIG. 6, the rear ends of the locking arms 132 and the locking projections 134 are shown therein. A tab 136 extends generally perpendicularly to each locking arm 132. Also, each of the locking projections 134 has a generally semicircular recess 138 on its forward edge 137.

As can be seen in FIG. 7, when the locking projections 134 are inserted into a mounting hole 150 of a mounting structure 170, the tabs 136 overlie the outer surface of the mounting structure 170. The locking projections 134 engage the inner surface of the mounting structure 170. As shown in FIG. 7, the recess 138 can help the locking projections 134 to "catch" the inside corner of the hole 150 of the mounting structure 170, thereby improving the retention of the locking projections 134.

Also, flexing of the adapter 100 to the mounted condition of FIG. 5 draws the fingers 138 toward each other. As such, the fingers 138 can grasp and capture a cable 190 positioned in the interior of the adapter 100. Thus, the adapter 100 not only has the capability of providing multiple mounting locations for cable hangers, but also can capture an additional cable itself.

Figure 8:
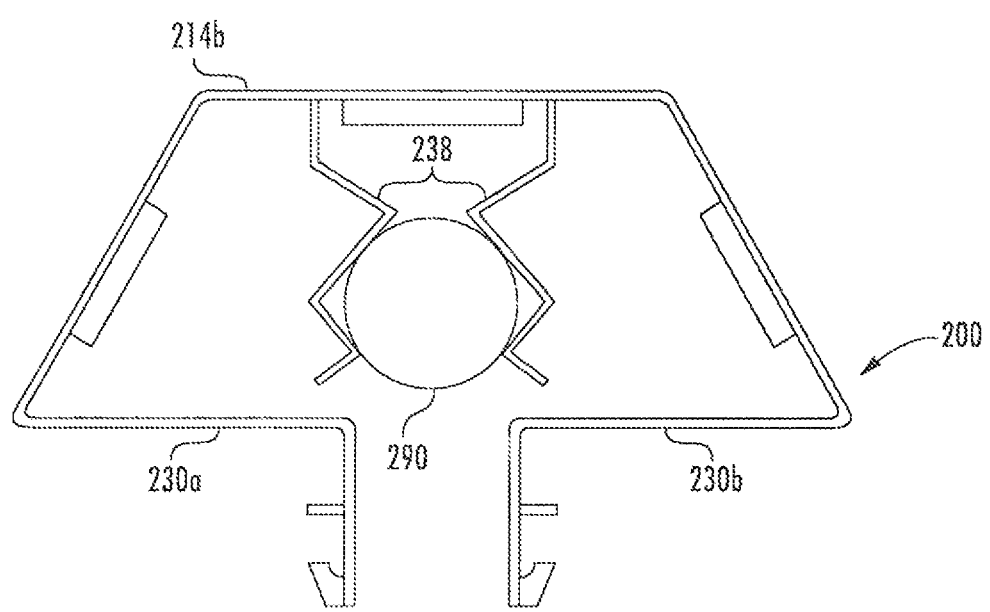
FIG. 8 is a top view of another cable adapter according to embodiments of the invention.

Referring now to FIG. 8, another cable hanger adapter, designated broadly at 200, is shown therein. The adapter 200 is similar to the adapter 100 with the exceptions that the fingers 238 extend from the mounting panel 214b rather than from the locking arms 232, and the fingers 238 are illustrated as having five segments each rather than three. It should be noted that, when the adapter 200 is flexed for mounting in the hole of a mounting structure, the fingers 238 are drawn toward each other to a much lesser degree (if at all) compared to the fingers 138 of the adapter 100, so the fingers 238 should be configured to deflect significantly on their own due to the presence of the cable 290 to provide sufficient grasping force on the cable 290.

Figure 9:
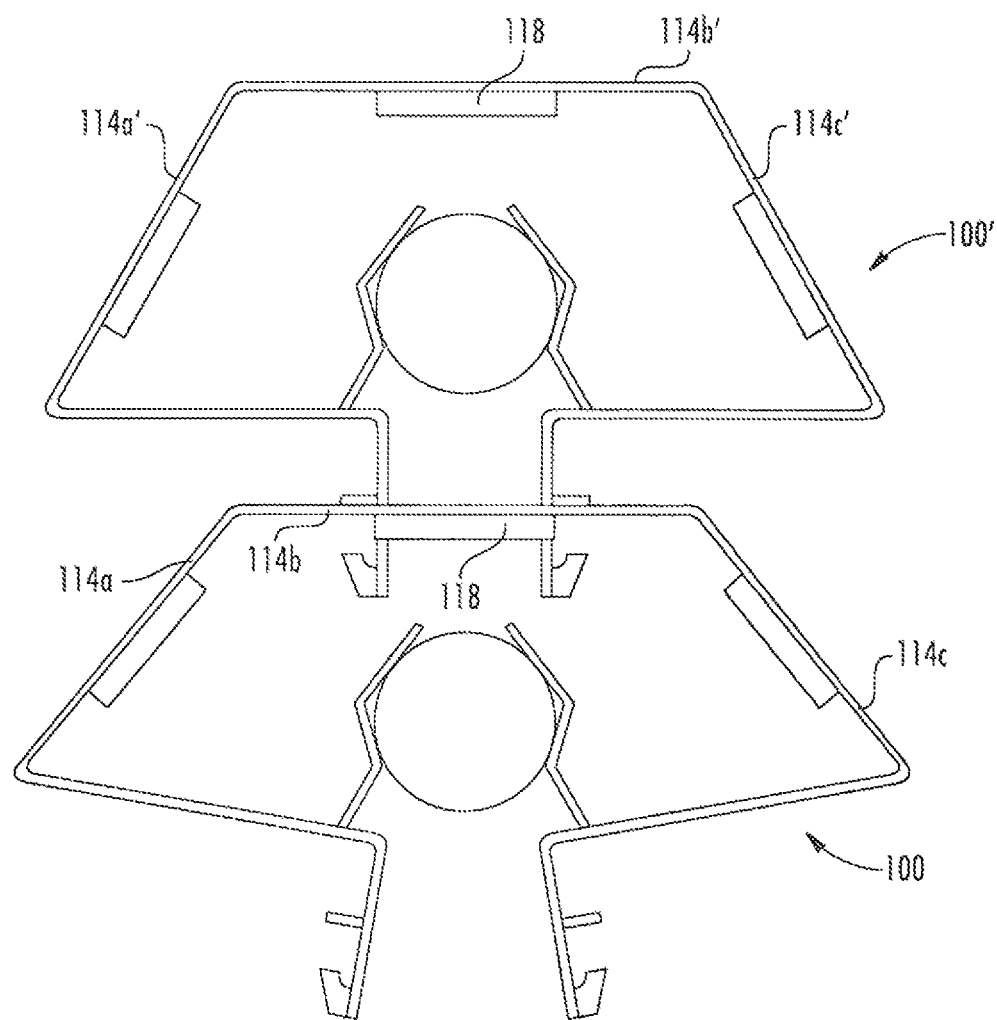
FIG. 9 is a top view of two adapters of FIG. 4, with one adapter mounted in stacked relationship to the other adapter.

As can be seen in FIG. 9, multiple adapters 100 may be employed to grasp and capture cables. FIG. 9 illustrates a first adapter 100 that may be mounted on a mounting structure, and a second adapter 100' that is mounted in the hole 118 of the mounting panel 114b of the adapter 100. Additional adapters may be added (either to the holes 118 of the mounting panels 114a, 114c of the adapter 100, or to the holes 118 of the mounting panels 114a'-114c' of the adapter 100') to create a larger stack for mounting additional cables and adapters. Also, conventional cable hangers can be added to either adapter 100, 100' as desired.

Figure 10:
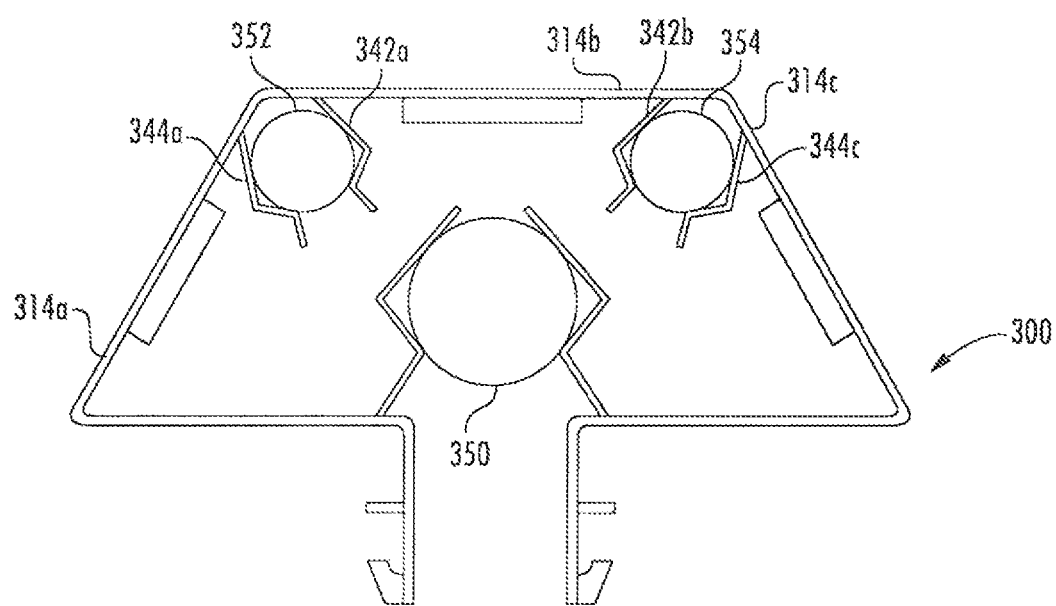
FIG. 10 is a top view of a further cable adapter according to embodiments of the invention.

Referring now to FIG. 10, another variety of adapter, designated broadly at 300, is shown therein. The adapter 300 is similar to the adapter 100 with the exception that two additional sets of fingers (designated 342a, 342b and 344a, 344b) are also included to grasp and capture additional cables. As shown in FIG. 10, the fingers 342a, 342b extend into the interior of the adapter 300 from opposite end portions of the mounting panel 314b. The finger 344a extends from the end portion of the mounting panel 314a nearest the mounting panel 314b, thus forming a pair of grasping members with finger 342a. Similarly, the finger 344b extends from the end portion of the mounting panel 314c nearest the mounting panel 314b, thus forming a pair of grasping members with finger 342b. As a result, the adapter 300 can grasp and capture three different cables 350, 352, 354.

Figure 11:
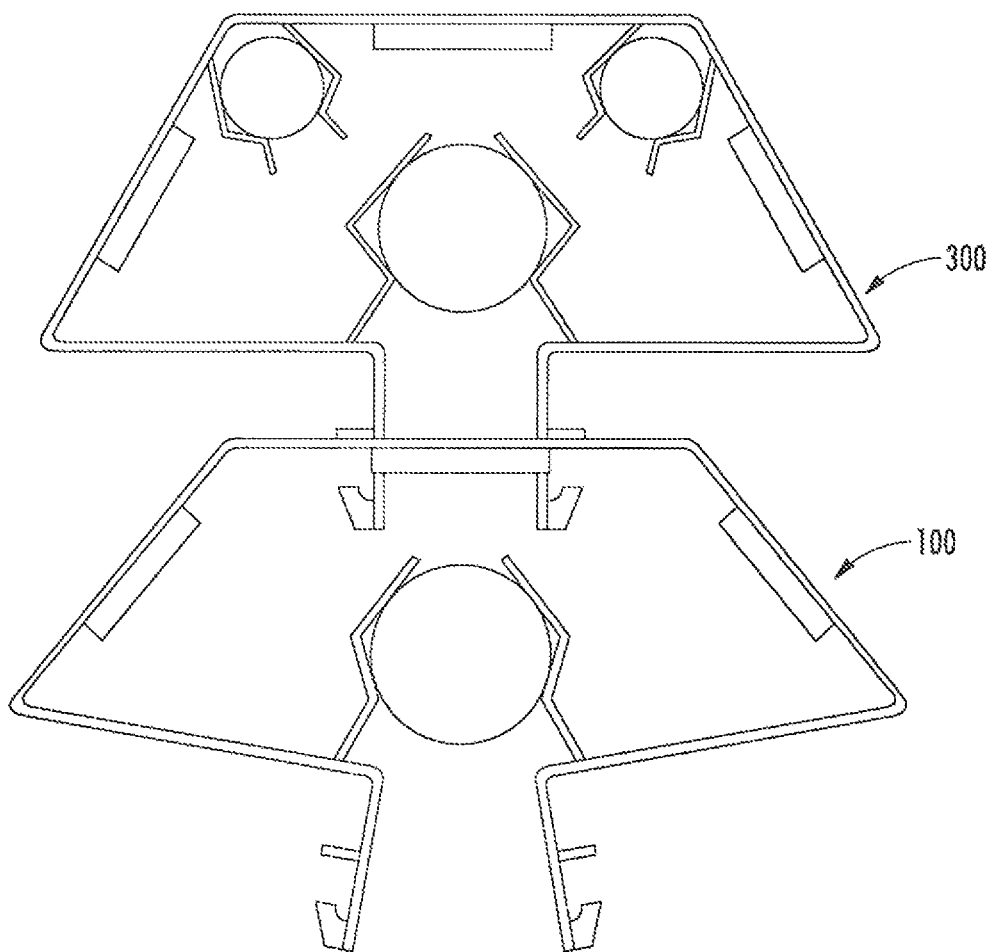
FIG. 11 is a top view of the adapter of FIG. 10 stacked on an adapter of FIG. 4.

FIG. 11 illustrates that the adapter 300 can be used in a stacked arrangement with other adapters, such as the adapter 100 (as shown), an adapter 200, another adapter 300, or other adapters and/or cable hangers.

Figure 12:
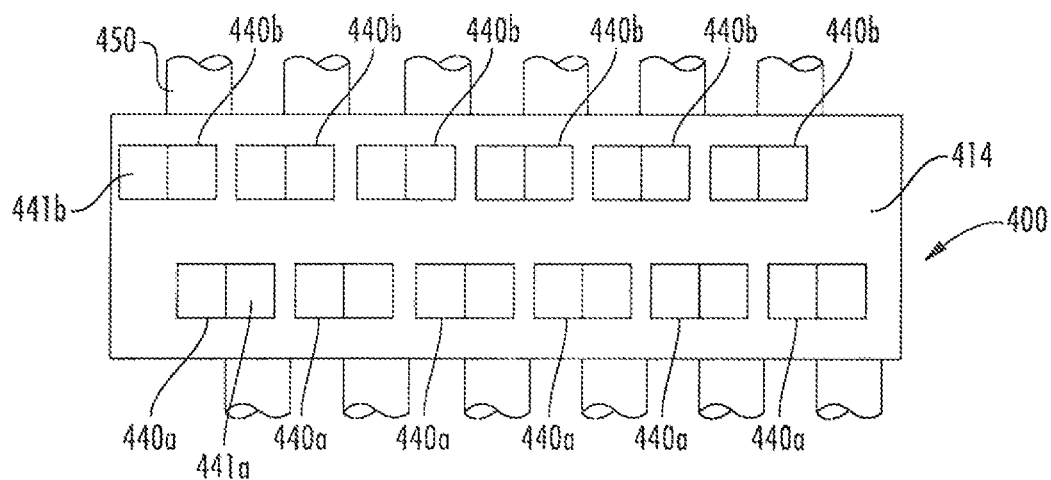
FIG. 12 is a top view of an additional cable adapter according to embodiments of the invention.
Figure 13:
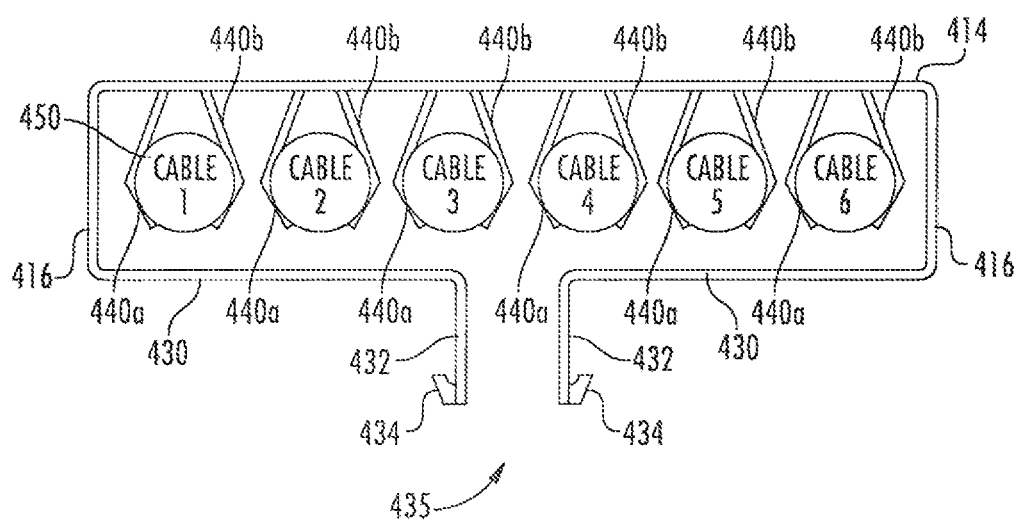
FIG. 13 is a front view of the adapter of FIG. 12.

Referring now to FIGS. 12 and 13, another adapter according to embodiments of the invention, designated broadly at 400, is shown therein. The adapter 400 has a mounting panel 414, two side walls 416, two base segments 430, two locking arms 432, and two locking projections 434. As can be seen in FIG. 13, the mounting panel 414 is generally parallel to the base segments 430 and has a greater length than the side walls 416. Six pairs of fingers 440 extend from the mounting panel 414 into the interior of the adapter 400 for grasping and capture of cables 450.

As can be seen in FIG. 13, each pair of fingers 440 includes a "left" finger 440*a* and a "right" finger 440*b* ("left" and "right" being determined from the vantage point of FIG. 13). As shown, each of the left and right fingers 440*a*, 440*b* comprises two segments, with one segment bent relative to the other. As can be seen in FIG. 12, the left and right fingers 440*a*, 440*b* of each pair of fingers are staggered from each other in the vertical direction of the adapter 400 (as used herein, "vertical" is intended to refer to the direction that is parallel with a cable mounted in the fingers, or toward the top and bottom of the page in FIG. 12). Each left finger 440*a* originates from the left edge of a hole 441*a* in the upper portion of the mounting panel 414; the six left fingers 440*a* (and the holes 441*a*) form a row across the upper portion of the mounting panel 414. Each right finger 440*b* originates from the right edge of a hole 441*b* in the lower portion of the mounting panel, such that the six right fingers 440*b* (and the holes 441*b*) form a row across the lower portion of the mounting panel 414.

Six cables 450 can be grasped and captured in the six pairs of locking fingers 440. As indicated in FIG. 13, the cables 450 can be introduced into the adapter 400 through the gap 435 between the locking projections 434.

Those of skill in this art will appreciate that the adapter 400 may also have a hole (not shown) in either or both of the mounting panel 414 and one or more of the side walls 416 that allow either cable hangers or additional adapters to be mounted thereto. Also, in some embodiments locking fingers may also originate and extend from one or more of the side walls 416.

The adapters illustrated and described herein may be formed of a variety of materials, such as steel and other metals. In some embodiments, the adapters may be stamped from a sheet of material, such as steel, and bent by known methods into the configuration shown. For example, the staggered arrangement of the left and right fingers 440*a*, 440*b* of the adapter 400 can enable the adapter 400 to be stamped and bent from a flat steel sheet.

Those skilled in this art will appreciate that configurations other than those explicitly illustrated and described herein may also be employed. For example, more or fewer fingers for grasping cables may be used with the various adapters. The shapes and relative positions of the fingers may vary, particularly depending on the thickness and weight of the varieties of cables anticipated to be secured with the adapters. The fingers of the same adapter may be configured differently; for example, one set of fingers may be configured to grasp a larger, heavier cable, and another set of fingers of the same adapter may be configured to grasp a smaller, lighter cable. Other configurations and variations will be apparent to those of skill in this art.

In addition, in some embodiments adapters may not "snap" into place for mounting. Instead of base segments, locking arms, and locking projections as described above, such adapters may have as a base a base panel similar to that shown at 12 in adapter 10. Inclusion of a base panel would allow the adapter to be mounted to a mounting structure via a bolt, hose clamp or the like.

It can be seen that adapters according to embodiments of the invention are capable of both grasping cables and providing mounting locations for cable hangers and additional adapters, thereby providing functionality and flexibility beyond that of conventional cable hangers and adapters.

Such flexibility may be particularly desirable for installations that may grow in the future, or when a current installation is retrofitted.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An adapter for assisting in the mounting of cables, comprising:
    three serially attached mounting panels, each of the mounting panels including a mounting hole;
    two base segments, each base segment attached to an edge of a respective mounting panel, each base segment being generally parallel with an intermediate one of the mounting panels;
    wherein the mounting panels and the base segments define an interior of the adapter;
    two locking arms, each locking arm extending from an edge of a respective base segment in a direction away from the interior;
    the device further comprising two fingers extending into the interior of the device from a respective base segment adjacent a respective locking arm, the fingers being configured to cooperate to grasp a cable.

2. The adapter defined in claim 1, wherein each of the locking arms includes a locking feature, the locking arms extending generally parallel to each other and defining a gap therebetween.

3. The adapter defined in claim 2, wherein the adapter can be deflected from a relaxed state to a deflected state by forcing the locking arms toward each other; and
    wherein in the deflected state the adapter may be mounted to a mounting structure, with the locking arms inserted through a hole in the mounting structure and exerting outward pressure on edges of the hole, and the locking features maintaining the adapter in a mounted position on the mounting structure.

4. The adapter defined in claim 1, wherein the adapter is formed as a monolithic component.

5. The adapter defined in claim 4, formed of a metallic material.

6. The adapter defined in claim 2, wherein the locking arms and locking features are configured for insertion into a nominal ¾ inch diameter hole in the mounting structure.

7. The adapter defined in claim 1, wherein each of the mounting holes has a nominal diameter of ¾ inch.

8. An adapter for assisting in the mounting of cables, comprising:
    three serially attached mounting panels, each of the mounting panels including a mounting hole having a nominal diameter of ¾ inch;
    two base segments, each base segment attached to an edge of a respective mounting panel, each base segment being generally parallel with an intermediate one of the mounting panels;
    wherein the mounting panels and the base segments define an interior of the adapter;

two locking arms, each locking arm extending from an edge of a respective base segment in a direction away from the interior;

the device further comprising two fingers extending into the interior of the device from a respective base segment adjacent a respective locking arm, the fingers being configured to cooperate to grasp a cable.

9. The adapter defined in claim 8, wherein each of the locking arms includes a locking feature, the locking arms extending generally parallel to each other and defining a gap therebetween.

10. The adapter defined in claim 9, wherein the adapter can be deflected from a relaxed state to a deflected state by forcing the locking arms toward each other; and wherein in the deflected state the adapter may be mounted to a mounting structure, with the locking arms inserted through a hole in the mounting structure and exerting outward pressure on edges of the hole, and the locking features maintaining the adapter in a mounted position on the mounting structure.

11. The adapter defined in claim 8, wherein the adapter is formed as a monolithic component.

12. The adapter defined in claim 11, formed of a metallic material.

13. A combination, comprising:

an adapter as defined in claim 1; and a cable hanger mounted on the mounting hole of the adapter.

\* \* \* \* \*